INVENTORS.
J.H. AUER JR. AND
H.C. KENDALL
BY
THEIR ATTORNEY

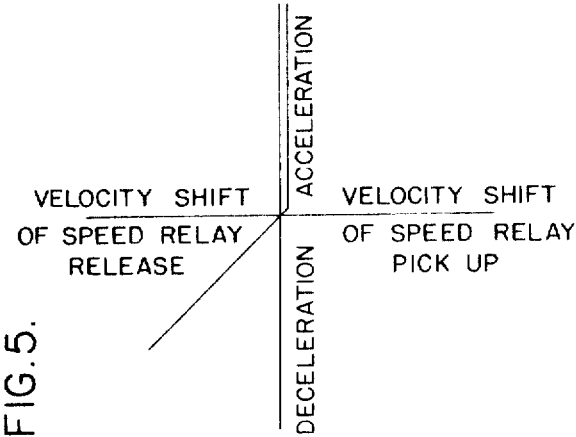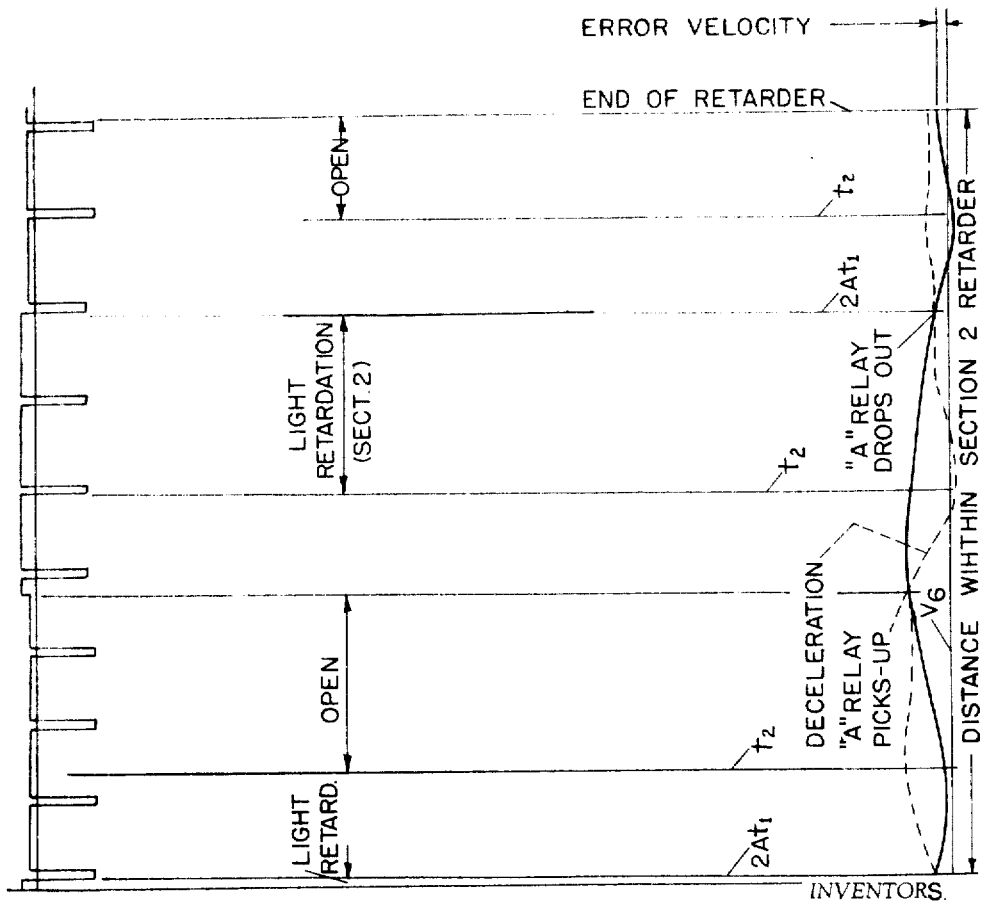

Aug. 23, 1966     J. H. AUER, JR., ET AL     3,268,725
AUTOMATIC CAR RETARDER CONTROL SYSTEM
Filed Dec. 22, 1958     6 Sheets-Sheet 6

INVENTORS
J.H. AUER JR. AND
H.C. KENDALL
BY
THEIR ATTORNEY

United States Patent Office 3,268,725
Patented August 23, 1966

3,268,725
AUTOMATIC CAR RETARDER CONTROL SYSTEM
John H. Auer, Jr., and Hugh C. Kendall, Rochester, N.Y., assignors to General Signal Corporation, a corporation of New York
Filed Dec. 22, 1958, Ser. No. 782,153
9 Claims. (Cl. 246—182)

This invention relates to automatic car retarder control system for railroads, and it more particularly pertains to systems for hump classification yards wherein car retarders of the track brake type are automatically controlled when braking a car in a maner that the speed of the car upon its leaving the retarder very closely approaches the preselected leaving speed.

The car retarder mechanisms generally employed are rugged and heavily built, and a substantial time element is involved in a conventional system between the time when it is determined that the retarder should be opened and the time when the retarder actually reaches an open position. It is therefore necessary to anticipate the effect of the retarder upon a car during this time interval in order to know just when to initiate operation of the mechanism to an open position. One form of a control organization for meeting the above problem is disclosed in our prior U.S. patent application Ser. No. 513,364, filed June 6, 1955, and now abandoned. The present invention is to be considered as providing improvement over the system disclosed in such prior application.

In the system provided by the present invention, the car retarder is opened in steps to apply successively less braking pressure as the speed of a car within the retarder is reduced. The reduction in the degree of retardation is accomplished by a plurality of speed relays that are actuated successively at different car speeds.

These speed relays are controlled in accordance with the velocity of a car moving through a retarder as compared to a preselected (computed) speed at which such car should leave the retarder, and also in accordance with the rate of change in the velocity of the car as it is moving within the retarder. This rate of change in the velocity of the car is directly applied to the control system for the speed relays in such a manner that a time advance is accomplished in their control which will compensate for the slow reaction time involved in the releasing operation of the retarder mechanism. By this system, the difference between the actual velocity of the car and the desired preselected (computed) leaving velocity can be made to approach zero. In other words, this difference between the actual velocity and the preselected leaving velocity can be conveniently termed the error velocity, and such error velocity can be made to equal or approach zero by this invention.

In connection with the above, it should be noted that the leaving or exit velocity of a car from a retarder is not a predetermined fixed quantity; but is rather a preselected computed velocity based on the characteristics of the car and other conditions involved in its free rolling movement. Some of these characteristics and/or conditions includes the weight of the car, the rollability of the car, track curvature, wind velocity, temperature of the bearings, track conditions, the distance the car must go, and the desired coupling velocity.

One object of this invention is to provide a control system for retarders operating automatically in accordance with the various conditions involved to provide more accurate control of the retarders to make its possible to more accurately control the speeds at which cars may be coupled to other cars already in the classification track to which they are being routed.

Another object is to provide a car retarder control system, which acts in accordance with the acceleration factor of a car passing through a retarder as well as its actual velocity, to provide more accurate control over the car so that its exit or leaving velocity will be substantially identical to the computed leaving velocity.

Another object of the present invention is to provide apparatus for indicating to an operator or maintainer the presence of any error velocity in a car or cut of cars passing through a car retarder, since the maintainer must be made aware of existing conditions in the system, such as the effectiveness of the retarder and the various components of the system.

Other objects, purposes, and characteristic features of this invention will in part be obvious from the accompanying drawings and in part be pointed out as the description of the invention progresses. In describing the invention in detail, reference will be made to the accompanying drawings in which like reference characters designate corresponding parts in the various views, and in which.

Figure 4A:
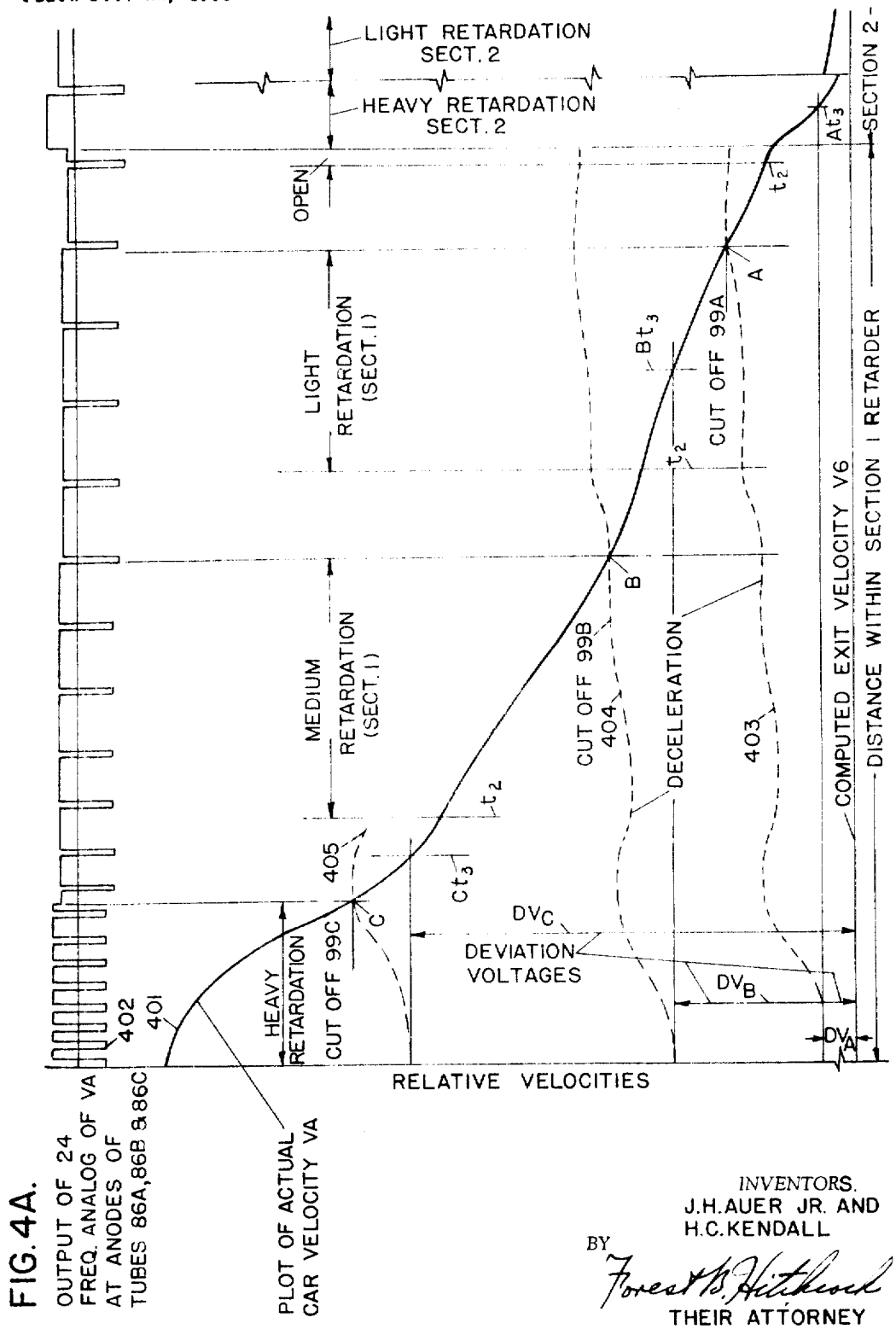
Figure 6:
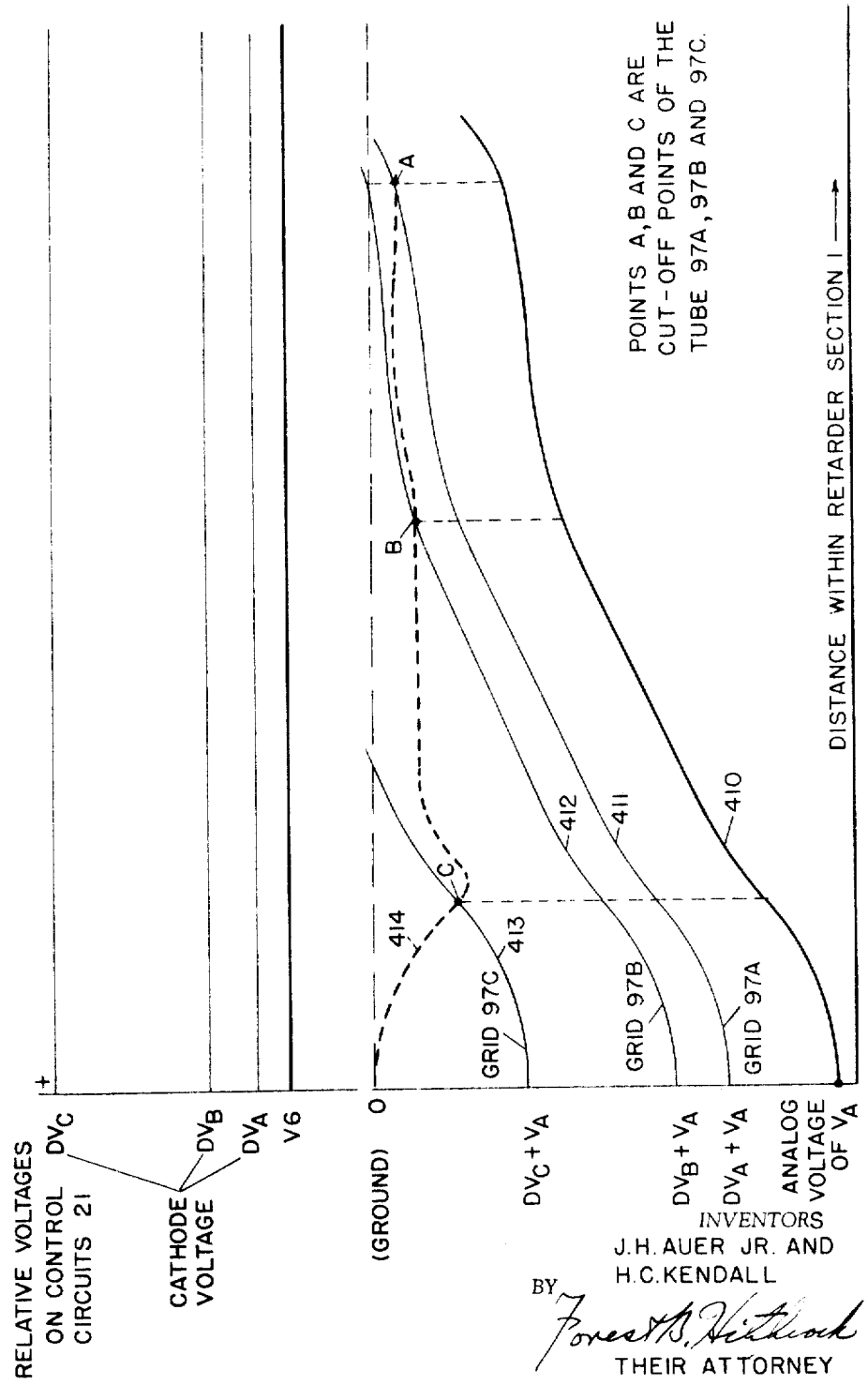

FIGS. 4A and 4B, when placed end to end, illustrate certain typical conditions of operation during the passage of a car through a retarder;

FIG. 5 shows certain typical conditions in graph form involving acceleration and deceleration of a car; and FIG. 6 shows a graph of certain relative voltages in the system related to velocity and involving acceleration and deceleration of a car.

All of the above drawings have been made to simplify the explanation of the present invention and to make it easy to understand the principles of operation of the system. There has ben no attempt to illustrate any specific construction or arrangement of parts as would commonly be used in practice, but the illustrations are all of the conventional diagrammatic type. The various relays and their contacts are shown in the conventional manner. The symbols (+) and (—) are employed to indicate the positive and negative terminals respectively of suitable batteries, or other sources of direct current; and the circuits in which these symbols are used, always have current flowing in the same direction relative to these symbols. The symbols (B+) and (B—) indicate connection to the opposite terminals of a suitable battery, or other direct current source, which has a central or intermediate tap connected to ground symbolized in the usual way; and the circuits in which these symbols are used, may have current flowing in one direction or the other depending upon the particular terminal (B+) or (B—) used in combination with the intermediate ground connection. The (B+) and (B—) designations are generally used in association with vacuum tube circuits where a higher plate potential is required than that normally associated with the (+) and (—) symbols of the relay circuitry.

GENERAL SYSTEM ORGANIZATION (FIG. 1)

Figure 1:
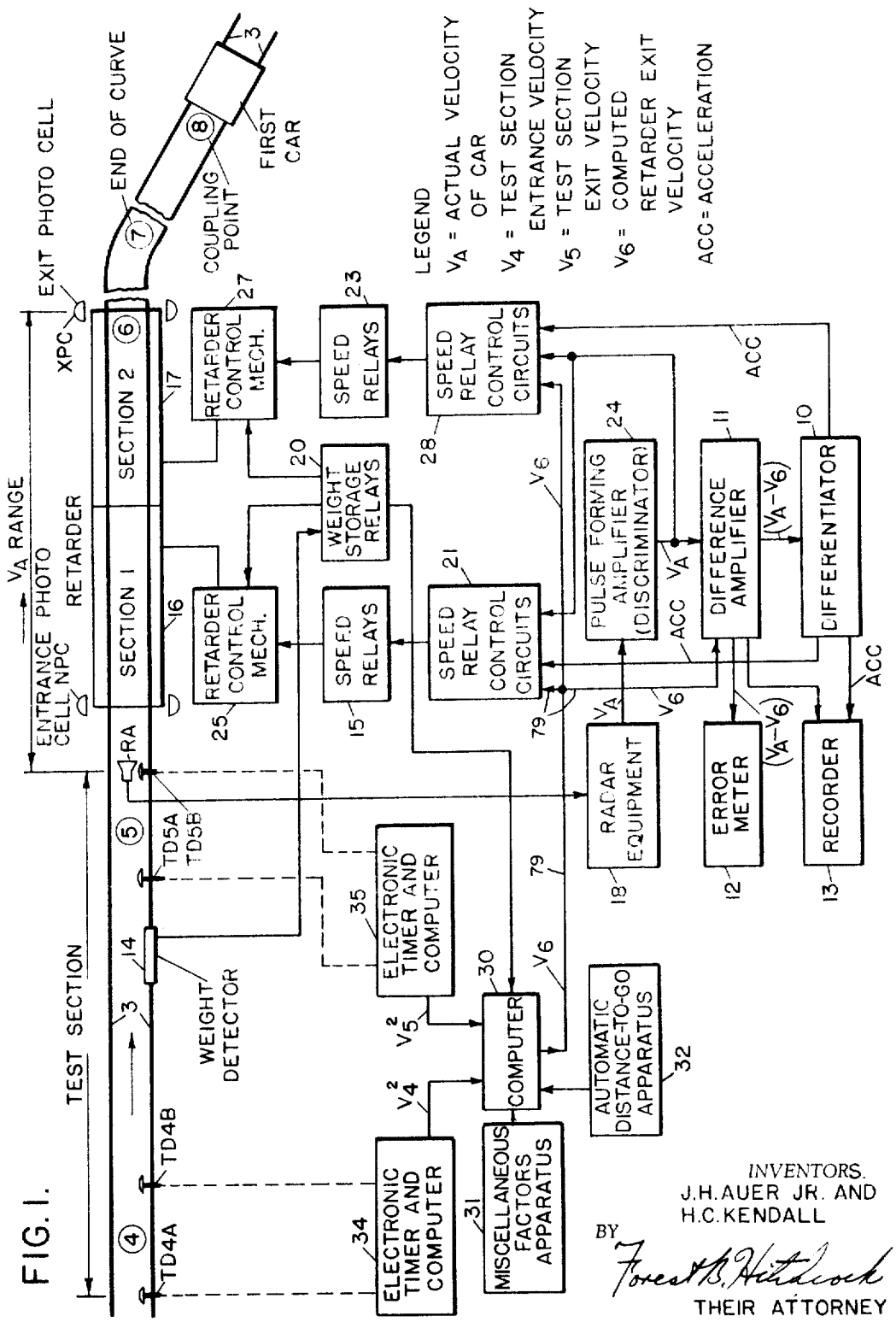
FIG. 1 is a block diagram of the car retarder control system of the present invention.

A portion of a typical track layout in a typical car classification yard for railroads has been shown in FIG. 1. This includes the rails 3 which extend through a test section and a retarder after which they branch into different classification tracks (not shown in detail) including a curved portion and a tangent portion of a particular classification track which is shown as having the first car of a group of cars standing on such classification track. The retarder is shown as having section 1 and section 2 closely adjacent to each other and both controlled in accordance with the system of the present invention.

A train of cars is pushed up the hump and the cars, either singly or in cuts of two or three, are allowed to roll under the influence of gravity down the incline of the hump through the various switches and branching tracks to the particular classification track selected for this respective car and/or cuts. There is usually a retarder located on the hump a suitable distance from its crest, and there are also other suitable group retarders located strategically to control the cars as they pass to their respective classification tracks. For convenience in the illustration, the general organization shown is related to a group retarder of the double section type strategically located with a preceding test section; but, it is to be understood that the same organization can be applied to a hump retarder.

At the entrance to this test section are two spaced treadles TD4A and TD4B which have suitable contacts that may be closed upon the passage of the wheels of a car. The actuation of these treadles by the leading wheels of a car transmits such input information to an electronic timer and computer 34 which is so constructed as to obtain the average velocity of the car between the two treadles TD4A and TD4B which effectively is the velocity of the car at point 4 substantially midway between the two treadles and conveniently termed the test section entrance velocity $V_4$. This electronic timer and computer 34 is also effective to square the average entrance velocity $V_4$ of the car and acts to provide a corresponding analog voltage output fed to the main computer 30 for reasons later discussed.

Near the exit of the test section two spaced treadles TD5A and TD5B, also with suitable contacts, provide input controls to the electronic timer and computer 35 which by timing the leading wheels of a car is able to obtain the test section exit velocity $V_5$ which is in effect the velocity of the car at point 5 substantially midway between the two treadles. This test section exit velocity $V_5$ is squared by the electronic timer and computer 35 providing a corresponding analog voltage output fed to the main computer 30 for reasons later discussed.

Adjacent to the treadles TD5B is the radar antenna RA which provides a suitable input to the radar equipment 18 of any suitable type, but which for convenience in this disclosure may be assumed to be of the type described in detail in the pending application of Kendall and Auer, Ser. No. 359,162, filed June 2, 1953. This radar equipment 18 is assumed to be of the interferometer type, and the passage of a car through the retarder reacts on the antenna RA to provide an input to the radar equipment 18 in accordance with the actual velocity $V_A$ of the car, so that such equipment 18 may provide an output analog frequency proportional to the actual velocity of the car as it moves through the retarder.

At the entrance to the retarder is a suitable entrance photocell organization NPC for detecting the presence of a car. Similarly, at the exit of the retarder is a suitable exit photocell organization XPC for detecting the presence of a car. Whenever a car is present in the entrance to the retarder interrupting the light beam of the entrance photocell organization, a relay NPCP is energized and caused to be picked-up (relay shown in FIG. 3 but without circuit details). Similarly, whenever a car is present at the exit end of the retarder and interrupts the light beam of the exit photocell organization XPC, a relay XPCP is energized and picked up (relay shown in FIG. 3 but without circuit details). These relays NPCP and XPCP and their respective repeater relays NPCPP and XPCPP provide in part the means by which it is possible to render the retarder control mechanism 25 subject to the automatic controls of the system of this invention.

Each retarder operating mechanism may be of any suitable type, but for convenience in this disclosure it is assumed to be of the electrically operated position type such as shown for example in the patent to W. K. Howe, Patent No. 1,852,572, dated April 5, 1932. It is of course understood that the operating circuits for such mechanism may be suitably arranged to be adaptable to automatic control as herein disclosed. Such retarder control mechanism is provided for each section indicated in FIG. 1 as being mechanisms 25 and 27 respectively.

Figure 3:
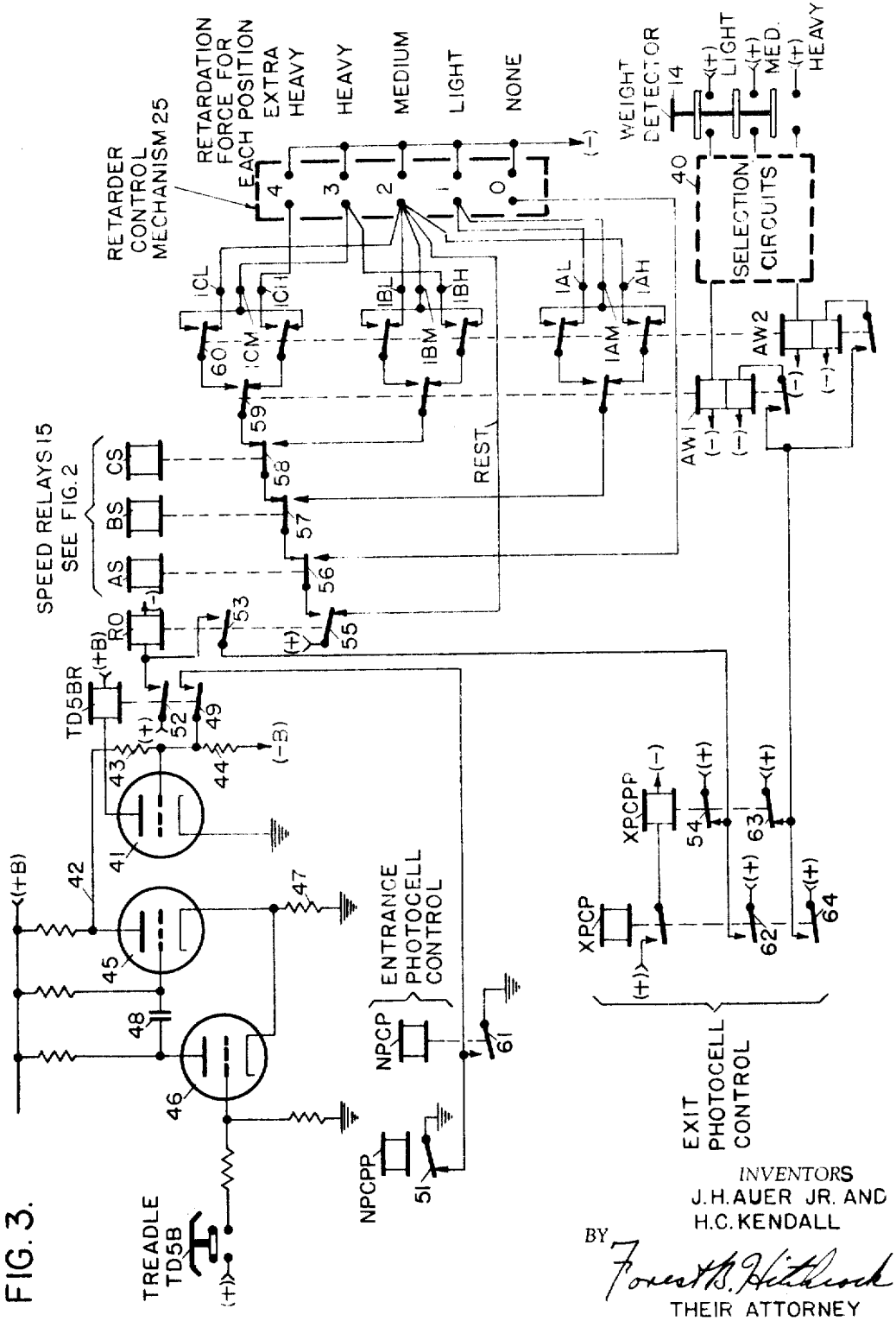
FIG. 3 is a schematic circuit diagram showing the manner in which the group of speed relays for a typical retarder cooperates with the weight detector apparatus and the photocell entrance and exit control to effect the operation of a retarder mechanism to its appropriate positions.

The circuits within the mechanism have not been shown in detail; but the controls leading to the typical mechanism 25 have been shown in detail in FIG. 3 where it is indicated that the retarder has four operating positions as well as a non-operated zero position. The zero position, of course, is one in which the retarder provides no braking action on the wheels of a passing car whereas the operating positions 1, 2, 3 and 4 respectively provide light, medium, heavy, and extra heavy retardation respectively, as indicated by the legends in FIG. 3.

A weight detector 14 is shown in FIG. 1 as being located just ahead of the treadle TD5A so that the weight group of each car may be registered and act upon weight storage relays 20 to provide the proper initial positioning of the retarder mechanisms and also to control them in accordance with the various factors as provided in accordance with the system of the present invention. The weight storage relays 20 are shown in FIG. 3 as including relays AW1 and AW2, but certain additional control relays have not been shown for the purpose of simplicity. Such additional relays and circuits are represented in FIG. 3 by a dotted rectangle. Their operation and effect on the system will be discussed in greater detail later. The weight detector 14 itself may comprise a suitable rail section, the amount of deflection of which operates suitable contacts. These contacts in turn suitably control the weight storage relays 20. The weight detector 14 may be of any suitable type responding to the deflection of a rail or a wheel actuated treadle. This latter type of detector may be of the type such as described in U.S. Pat. No. 2,868,534, of S. M. Phelps, granted January 13, 1959. It is of course understood that any suitable type of weight detector may be employed in the system of the present invention.

Referring to FIG. 3, it will be noted that the weight storage relays AW1 and AW2 include contacts for the control of the retarder control mechanism 25; but, it should be also understood that these relays AW1 and AW2 include contacts for the control of circuits for the retarder control mechanism 27. In addition, such circuits include contacts of the speed relays 23 similar to those shown in FIG. 3 for speed relays 15. Such circuits are also controlled by the entrance and exit photocell control relays NPCP, NPCPP, XPCP and XPCPP, and also the treadle relays TD5BR and RO. Such circuits have not been shown in detail since those of FIG. 3 may be considered as typical.

The main computer 30 is an analog computer capable of solving the equations involved, as will be discussed in detail later, and may be of some suitable commercial type or may be especially constructed for the purpose of solving the equations involved in the organization of the present invention. Such analog computer may employ suitable elements such as operational amplifiers, calibrated resistors, regulated voltage sources and the like, as required to obtain the desired output voltage $V_6$ as an analog of the computed velocity at which a car should leave the retarder at its exit end designated as point 6. The various elements of analog computers can be found from any suitable text book on the subject, such as the book entitled "Electronic Analog Computer," written by Korn and Korn, and published in 1956 by the McGraw-Hill Publishing Co. (Library of Congress Catalog Card No. 51–12622).

This main computer 30 has various miscellaneous factors as represented by the apparatus 31. These various factors L, R, A, D, Y, $g$, $n$, $W_w$, and W, found in the equation to be solved, are suitably inserted either by permanent settings or by adjustable settings under this miscellaneous factors apparatus 31.

The L factor is one which the operator determines and is established to compensate for the peculiar characteristics of a light weight car.

The R factor is also one over which the operator has control and makes a suitable setting under varying conditions such as temperature of bearings, wind resistance, rust or icing conditions of the track, and the like.

The A factor is one which is set in accordance with the curved track rolling frictional force energy in feet of elevation or head per degree of curvature. This factor may be obtained experimentally and inserted either by automatic means or by suitable manual means.

The D factor represents the number of degrees of curvature between the particular points 4 and 5 or the points 6 and 8.

The Y factor is the relative datum plane or elevation at the points specified such as 6 and 8, which may vary from classification track to classification track dependign upon the layout involved.

The factor $g$ is of course the acceleration due to gravity for the particular location.

The factor $n$ represents the number of wheels on a car which is, for conventional freight cars, usually eight.

The factor $W_w$ is the average weight for each wheel of a conventional car.

The factor W reprsents the total weight of the car, which for the purposes of the present disclosure is assumed to be divided into three groups, which are selectable by the weight detector 14; but, it is to be understood that a larger number of groups may be employed, or a detector could be employed which would give an analog voltage of the actual weight of a car.

In addition to the above, a factor representing the distance a car must go to a coupling point is conveniently termed a distance-to-go factor which is added to the computer by automatic distance-to-go apparatus 32. This means that the distance from the leaving point 6 of the retarder to the first car at point 8 in the classification track is supplied to the main computer 30.

The output of the computer 30 is an analog voltage $V_6$ representing the computed velocity for a car leaving the retarder at point 6. This analog output voltage is supplied to the speed relay control circuits 21 and 28 and also to the difference amplifier 11. It will be noted that the speed relays CS, BS and AS of FIG. 2 may be considered as typical of both the speed relays 15 and 23, since the organization and operation is the same in both instances; but for the sake of definitness they have been designated as speed relays 15.

Figure 2:
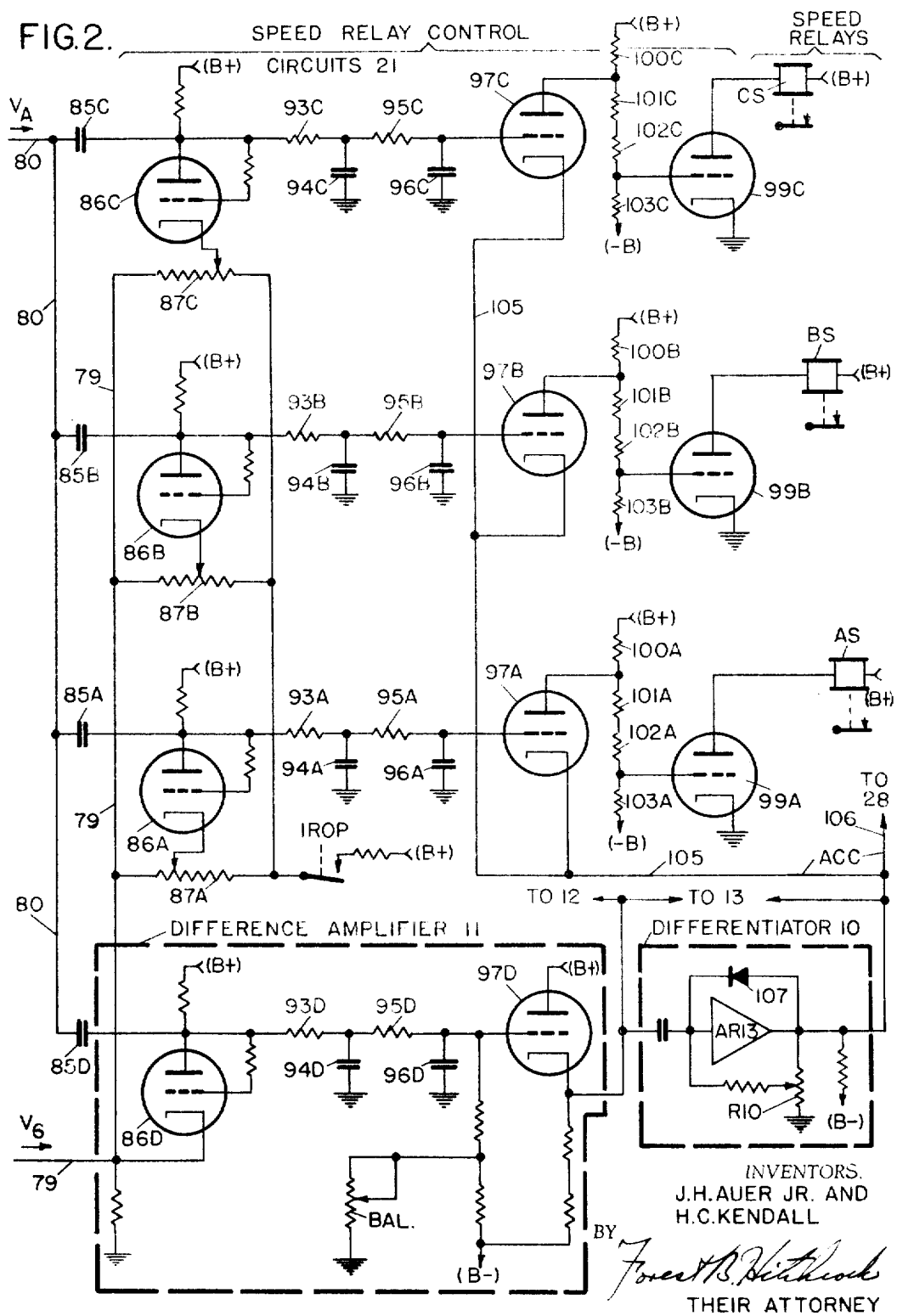
FIG. 2 is a schematic circuit diagram of the speed controlled relays for a retarder and some of the associated electronic circuitry employed in the organization of FIG. 1 to embody the present invention.

The radar equipment 18 supplies an output which is an analog frequency of the actual velocity of a car. This analog voltage of the car velocity is fed to the pulse forming amplifier or discriminator 24 which may be of the same general type disclosed in our prior application Serial No. 513,364, above mentioned, with the exception that the speed relay control circuits which are included in this apparatus have a double integrating network such as 93A, 94A, 95A and 96A as shown in FIG. 2. The action of this double integrating circuit network is to provide a smooth direct current voltage for the grid control of tube 97A of FIG. 2, so that it will follow changes in frequency with a minimum of time delay and control the tubes accordingly. The above circuit description is typical of the speed relay control circuits 21, but applies equally well to the B, C and D circuits prefixed by the same numbers.

The pulse forming amplifier 24 supplies an input $V_A$ to the difference amplifier 11 via wire 80 which has been shown in detail in FIG. 2. Such difference amplifier also supplies an output to an error meter 12 and a recorder 13 as well as the differentiator 10. The differentiator 10 supplies one output to the speed relay control circuits 21 and another output to the speed relay control circuits 28. Such differentiator 10 is shown as being an operational amplifier suitably connected as in FIG. 2. Another output of this differentiator 10 is supplied to the recorder 13. This differentiator 10 is a device which makes the output from the difference amplifier and provides the differential of the error voltage with respect to time. Such output of the differential amplifier then represents acceleration (ACC) which is applied to the speed relay control circuits 21 and 28 for purposes discussed in greater detail hereinafter.

The error meter 12 is employed so that the supervising operator or maintainer can currently determine whether or not the apparatus is operating within a desired degree of accuracy. For example, the car retarder shoes may become worn and need replacing, or some other element of the system may be failing to provide full efficiency in the retarder control. On the other hand, the recorder 13 provides a permanent record of the performance of the system.

The speed relay control circuits 21 of FIG. 2 then act on their respective speed relays 15 including relays CS, BS and AS, which in turn control the actual positions of the retarder section in a manner typically shown in FIG. 3 and later described. It should also be noted that the treadle TD5B of FIG. 1 has an additional contact in FIG. 3 for initiating the operation of the control for the retarders, which contact is in addition to those on treadle TD5B for the control of the electronic timer and computer 35.

It is believed that the structure of the organization will be best understood by further consideration being given to its operation together with the functioning of various of the circuits. Also, mention will be made of such structural characteristics as are essential or desired to accomplish the purposes intended.

OPERATION

Let us assume that a car has been released from the hump and is rolling freely down the grade to the test section shown in FIG. 1. The successive operation of the treadles TD4A and TD4B produces two controls for the electronic timer and computer 34 which determines the test section entrance velocity $V_4$ for the car. The computing elements of this structure are then effective to produce the square of this entrance velocity $V_4$ in the form of an analog output voltage ($V_4^2$) which is supplied to the main computer 30.

As the car passes through the test section, it passes over the weight detector 14 and actuates the weight relays of FIG. 3 in accordance with the particular weight group in which that car falls. If the car is light-weight, the relay AW1 is picked-up; but if the car is of medium-weight, both relays AW1 and AW2 are picked-up. However, should the weight of the car fall in the heavy classification, then the relay AW2 would be picked-up but the relay AW1 would be dropped away. The details of this control of the weight relays AW1 and AW2 have been omitted, but it is to be understood that any suitable circuit selecting organization to accomplish this purpose may be employed. It is believed sufficient for the purposes of this disclosure to note that the relays AW1 and AW2 when selectively picked-up due to the passage of a car over the weight detector 14, are maintained energized through their respective stick circuits until the car exits from the retarder at point 6 as indicated by the operation of the exit photocell XPC and related apparatus.

The operation of the weight storage relays 20 causes the appropriate weight classification information to be given to the computer 30.

The car passing through the test section then passes over the treadles TD5A and TD5B in succession. The operation of these treadles produces two different kinds of control, i.e. (1) the successive operation of treadles TD5A and TD5B produces two controls for the electronic timer and computer 35; (2) the actuation of treadle TD5B alone acts to render the retarder operation relay RO active to effect the initial positioning of the retarder before the car enters the retarder. Since the initial positioning of the retarder is immediately rendered effective and the computing operation can take place concurrently, it is believed to be desirable to first discuss the initial positioning of the retarder and then to consider the operation of the computer.

More specifically, the relay TD5BR (see FIG. 3) is picked up by the conduction of tube 41 which is normally held in a state of nonconduction by its grid potential which in turn is fixed by the voltage on wire 42 and the voltage division by resistors 43 and 44. The voltage on wire 42 is determined by the condition of tube 45 which is maintained in a conductive state by having a positive voltage on its control grid. The tube 46 is a tube used to control tube 45, which tube 46 is normally in a non-conductive state because its control grid is at substantially ground potential and its cathode is at a positive potential by an amount equal to the potential drop across resistor 47 caused by the conductive current of tube 45.

When the treadle TD5B is actuated (see FIG. 3), a positive potential which is more than that appearing on the cathode of tube 46, is applied to the control grid of tube 46 thereby causing its conduction. This conduction of tube 46 causes the plate voltage to drop. The capacitor 48 discharges in an attempt to maintain the voltage level on the plate of tube 46. This causes the grid of tube 45 to fall below the cutoff value for such tube 45 to place it in a non-conductive state. This increases the voltage on wire 42 which is turn causes the grid of tube 41 to go more positive and render it conductive to energize relay TD5BR.

In addition, it should be noted that tubes 45 and 46 act as a one-shot multivibrator which can be quickly triggered by a brief closing of the contact on the treadle TD5B, but which acts to put out a long pulse regardless of the immediate opening of such treadle contact. The duration of this pulse is measured by the time required for the capacitor 48 to discharge through the tube 46. This mode of operation is similar to that described on pages 16 and 17 of the above-mentioned application Ser. No. 513,364. This long pulse insures the proper operation of the treadle repeating relay TD5BR.

When the relay TD5BR picks up, it closes its front contact 49 to connect ground to the grid of tube 41 to establish a stick circuit condition for maintaining the relay TD5BR energized, since the actuation of the treadle TD5B is momentary, until the car has entered the retarder as indicated by the response of the entrance photocell NPC, later described. This stick circuit includes back contact 51 of relay NPCPP. The closure of front contact 52 of relay TD5BR energizes the retarder operate relay RO, which closes its front contact 53 when it picks up to close a stick circuit energized through back contact 54 of relay XPCPP. This stick circuit is maintained closed until the car leaves the retarder as indicated by the actuation of the exit photocell XPC. Throughout the time that the retarder operation relay RO is picked up, the retarder control mechanism 25 can be positioned in accordance with the controls established by the weight storage relays 20 and the speed relays 15.

Let us assume that a medium weight car is to go through the retarder under automatically controlled conditions and traveling at a speed requiring considerable retardation. Then, when the retarder operation relay RO is picked up, a circuit is established for energizing the retarder control mechanism 25 to operate it to position 3 for the application of a "heavy" retardation force. This is because under normal conditions the speed relays AS, BS and CS are energized. Specifically, this circuit is closed from (+), through a circuit including front contact 55 of relay RO, front contact 56 of relay AS, front contact 57 of relay BS, front contact 58 of relay CS, front contact 59 of relay AW1, front contact 60 of relay AW2, position 3 of retarder control mechanism 25, to (−). This causes the retarder control mechanism 25 to operate from its rest position 2 (medium) to its "heavy" position 3.

Since the retarder is now positioned for the entrance of the car, we may now return to a consideration of the computing operation.

The successive operation of the treadles TD5A and TD5B produce two controls for the electronic timer and computer 35 which determines the test section entrance velocity $V_5$. The computing elements of this electronic timer and computer 35 are then effective to square the analog voltage for velocity $V_5$ to produce an analog output voltage $V_5^2$ which is supplied to the main computer 30.

As above described, the various miscellaneous factors in the form of analog voltages are supplied to the main computer 30 from the miscellaneous factors apparatus 31. In addition, the automatic distance-to-go apparatus 32 supplies a suitable input to the main computer 30 in accordance with the distance the car must go for the particular route selected for it. For this reason, the automatic distance-to-go apparatus 32 must be controlled in accordance with the route selecting apparatus in any suitable manner but which has not been shown for the purposes of simplicity in the present disclosure.

The main computer 30 takes the various factors and performs a computing operation to determine the velocity at which the car should leave the retarder at point 6. For convenience, such leaving velocity of the car is termed the computed retarder exit velocity $V_6$ which is of course in the form of an analog voltage which acts to selectively control the speed relay control circuits 21 and 28, and in addition is fed to the difference amplifier 11.

Before considering how the speed relay control circuits are operated upon both by the computed retarder exit velocity $V_6$ and the acceleration factor ACC, the manner in which the main computer 30 provides an analog voltage of the computed retarder exit velocity $V_6$ will be discussed.

The various elements of a suitable analog computer are arranged to handle the various factors supplied to the computer 30 as involved in the following equations, it being understood that these particular equations are given by way of example to show one form of operation of the computer 30. It is of course understood that the equation solved should be adapted to the particular circumstances of practice and for such reason may have other factors added as the circumstances of practice may require. For the purposes of the present disclosure the computed retarder exit velocity $V_6$ is obtained from the following expression derived from the energy relationship involved in the car passing through the test section:

*Equation 1*

$$V_6 = \sqrt{V_8^2 + 2g_0\left[\left(\frac{F_0}{W}\right)_{68} S_{68} + AD_{68} - (Y_6 - Y_8)\right]}$$

wherein:
$V_6$ = exit velocity from the retarder
$V_8$ = the desired coupling velocity
$F_0$ = tangent track rolling frictional force
$S_{68}$ = distance from point 6 to 8
$A$ = curved track rolling frictional force in feet of head per degree
$D_{68}$ = number of degrees of curve between points 6 to 8
$Y_6$ = datum plane at point 6
$Y_8$ = datum plane at point 8 wherein:

$$g_0 = g\left(\frac{1}{1+\frac{nW_w}{W}}\right)$$

$g$ = acceleration of gravity
$n$ = number of wheels on the car
$W_w$ = weight of each wheel
$W$ = total weight of the car The value of $F_0$ is not determined separately in this invention but rather ratio of $(F_0/W)_{68}$ taken as a whole. This value is as follows:

*Equation 2*

$$\left(\frac{F_0}{W}\right)_{68} = LR\left(\frac{F_0}{W}\right)_{45}$$

wherein:

$L$ = the light car factor
$R$ = the ratio factor $(F_0/W)_{45}$ is given the following expresson:

*Equation 3*

$$\left(\frac{F_0}{W}\right)_{45} = \frac{1}{S_{45}}\left[(Y_4 - Y_5) - AD_{45} - \frac{V_5^2 - V_4^2}{2g_0}\right]$$

wherein:

$F_0$ = tangent track rolling frictional force
$W$ = total weight of the car
$S_{45}$ = distance from point 4 to point 5
$Y_4$ = datum plane at point 4
$Y_5$ = datum plane at point 5
$A$ = curved track rolling frictional force in feet of head per degree
$D_{45}$ = number of degrees of curve between point 4 and point 5
$g_0$ = (see line 6, column 9)
$V_5$ = exit velocity from test section
$V_4$ = entrance velocity to test section The output of the computer 30 (see FIG. 1) is a direct current voltage which is an analog of the computed retarder exit velocity designated $V_6$. This analog voltage $V_6$ is applied over wire 79 to the speed relay control circuits 21 and also to the difference amplifier 11 both shown in detail in FIG. 2. It should be understood that a similar connection is made to the speed relay control circuits 28, but which has not been shown for the sake of simplicity in the disclosure since the speed relay control circuits 21 may be considered typical.

Before further considering the operation with respect to the speed relay control circuits 21, it is necessary to consider the actual velocity of the car, and its acceleration or deceleration as it progresses through the retarder.

Just as soon as the front of the car passes the radar antenna RA, the axles and various parts of the undercarriage reflect the radar signal, which reflected signal is compared with the transmitted signal to provide a beat frequency proportional to the actual velocity of the car. Such beat frequency is produced by the radar equipment 18 to feed an analog frequency proportional to the actual velocity $V_A$ of the car. This analog frequency of the velocity $V_A$ is fed to a suitable pulse forming amplifier 24, one such pulse forming amplifier having been disclosed in our prior application, Ser. No. 513,364, filed June 6, 1955, and shown as comprising a cathode follower, a clamper, a squaring amplifier, a pulse gate, a one-shot multivibrator, and an amplifier. This pulse forming amplifier 24 then provides equal width pulses at a rate proportional to the speed of the car. The amplitude of such pulses are also of equal value regardless of the speed of the car. In other words, frequency is the only variable, and the frequency of the pulses will vary proportionately as the actual velocity of the car varies.

In the present invention, the analog voltage of the actual velocity $V_A$ of the car is fed to the difference amplifier 11 and also to the speed relay control circuits 21 and 28. Specifically, this voltage output from the pulse forming amplifier 24 is applied to the wire 80 to supply such pulses to the typical speed relay control circuits 21 and also to the difference amplifier 11 both shown in detail in FIG. 2.

The computed retarder exit velocity represented by the direct current analog voltage $V_6$ is applied over wire 79 to the cathodes of the tubes 86A, 86B and 86C to establish the level at which the respective tubes may effect control. The potentiometers 87A, 87B and 87C are set at suitable positions to provide about one mile per hour difference for the operation of the respective tubes to be effective (as later explained) for the control of their respective speed relays AS, BS and CS.

Let us consider the effect of the computed exit velocity $V_6$ and the detected actual velocity $V_A$ without considering the action of the difference amplifier 11 and its control through the differentiator 10 and the tubes 97A, 97B and 97c. For example, if a computed exit velocity $V_6$ is considered to be six miles per hour for the retarder section 2, than this computed exit velocity $V_6$ is modified for the retarder section 1 and may be in the order of nine miles per hour. For the retarder section 1, the relay CS would then drop away when the car had been reduced to a velocity of eleven miles per hour while the relay BS would drop away when the velocity $V_A$ of the car had been reduced to ten miles per hour. Then the relay AS would be released when the actual velocity had been reduced to about nine miles per hour. A similar situation is true for the speed relays for retarder section 2, i.e. relay CS would drop at about eight mile per hour, relay BS would drop at about seven miles per hour, and relay AS would drop at about six miles per hour. In other words, the settings on the potentiometers 86A, 86B and 86C determines the differences between the dropaway values of the several speed relays AS, BS and CS for each section.

The frequency of the pulses on wire 80 is an analog of the actual velocity $V_A$, and these pulses are applied through capacitors 85A, 85B and B5C to the anodes of the respective clamping diodes 86A, 86B and 86C. This allows the direct current reference level of the pulse train on wire 80 to be isolated and separated into separate reference levels for the anodes of each of the tubes 86A, 86B and 86C. These reference levels are established with regard to the cathodes of these tubes in accordance with the settings of their respective potentiometers 87A, 87B and 87C. This has been illustrated in FIGS. 4A and 4B by the positive excursions of the pulse train 402 being at different levels for different portions of the operation illustrated. It is to be understood that the differences determined by the settings of potentiometers 87A, 87B and 87C may be set at any desired relative positions in accordance with the circumstances encountered in practice.

By way of a further example, if the computed exit velocity $V_6$ as modified for retarder section 1 is nine miles per hour, then the voltage applied to wire 79 is such that the output of the tubes 86A, 86B and 86C maintains their respective speed relays energized until the car has been decelerated to approximately eleven miles per hour at which time the frequency of the pulses supplied to wire 80 represents such eleven miles per hour and as a consequence the output of tube 99C is insufficient to maintain the relay CS picked up (neglecting for the time being the effect of the deceleration factor ACC). Similarly, when the speed of the car is reduced one mile per hour lower, then the input to wire 80 is such that tube 99B is no longer effective to produce an output which will maintain the relay BS picked up (neglecting for the time being the effect of the decelerating factor ACC). The same operation takes place with regard to the tube 99A which requires that the actual speed of the car be reduced still further such as by one mile per hour before it is effective to control its relay AS (neglecting for the time being deceleration factor ACC). In this way, the actual velocity $V_A$ of the car, as it is reduced by the action of the car retarders for section 1 is compared with the computed exit velocity $V_6$ as modified for this retarder section 1, in predetermined successive steps. A similar operation takes place with regard to the control of the speed relays for the retarder section 2. It should be understood that these successive steps for the speed relays of either section would be similarly applied for any other computed exit velocities which may exist for other cars.

Keeping in mind that the computed exit velocity $V_6$ is in the form of a stored direct current voltage which is fed into the speed relay control circuits 21 and 28 and also into the difference amplifier 11, we will now consider the operation of the difference amplifier 11 and differentiator 10 before further considering the speed relay control circuits 21 in greater detail.

The difference amplifier 11 provides the error velocity, or the difference between the actual velocity and the desired computed velocity, i.e. $(V_A-V_6)$. This error velocity in the form of an analog voltage is shown in FIGS. 1 and 2 as being fed to the error meter 12 to provide a running check of the system for the operator and also to the recorder 13 to provide a permanent record of the operation.

The computed exit velocity $V_6$ in the form of a D.C. voltage is applied by wire 79 to the cathode of tube 86D; whereas, the actual veloicty $V_A$ in the form of equal width and equal amplitude pulses which vary in frequency is applied from the pulse forming amplifier 24 to the difference amplifier 11 on wire 80 connected through a capacitor 85D to the anode of tube 86D.

If the actual velocity $V_A$ is constant, then the frequency of the pulses will be constant and as a result of the output of tube 86D is applied to the double section network of resistors and capacitors 93D, 94D, 95D and 96D to establish a constant direct current voltage applied to the grid of the cathode follower tube 97D representative of the difference between $V_A$ and $V_6$. On the other hand, if the actual velocity $V_A$ is decreasing, then the integration of these pulses by the double section network produces a direct current negative voltage of decreasing value. The opposite is of course true, i.e. if the actual velocity $V_A$ is increasing the direct current negative voltage is also increasing. The application of such varying analog of the difference between the actual velocity and the computed velocity is applied to the cathode follower 97D which in turn supplies a corresponding output to the differentiator 10.

This differentiator 10 is in the form of an analog computer which provides, in voltage form, an output proportional to the rate of change of the direct current analog input, i.e. the acceleration of the car ACC. Such acceleration ACC in the form of direct current voltage may be derived from either the actual velocity or the error velocity, since the desired computed velocity $V_6$ is constant. In the organization of this invention, the voltage analog of the error velocity is employed, but this is not a necessary requisite to the practice of the invention.

The potentiometer R10 provides an adjustable feedback control for the operational amplifier AR13 for the purpose of setting the scaling factor for some particular voltage unit for each foot per second squared of acceleration or deceleration. The output analog voltage is fed over wire 105 to the speed relay control circuits 21 and over wire 106 to the speed relay control circuits 28. The analog of the acceleration is applied from wire 105 to the cathodes of the tubes 97A, 97B and 97C. In this way, the acceleration analog voltage is able to modify the control of a comparison between the computed exit velocity $V_6$ and the actual velocity $V_A$. For example, if the speed relay control circuits 21 are adjusted to cause the speed relay CS to release at the time when the actual velocity $V_A$ corresponds to the computed velocity $V_6$, such operation can be modified above such computed velocity dependent upon whether the retarder is causing rapid or slow deceleration on the particular car involved.

As above mentioned, the speed relays 15 and 23 each include three relays. More particularly, the speed relays 15 are shown in FIG. 2 as having relays AS, BS and CS representing respectively slow, medium and fast relative speeds for their section 1 of the retarder.

In this connection, the above formulas are solved for a factor for a computed retarder exit velocity $V_6$ for a car. Thus, the computer provides an analog voltage corresponding to the factor $V_6$ which voltage is applied to the control apparatus for a retarder including sections 1 and 2. The computed exit velocity $V_6$ is for the point 6 at the exit to section 2 of the retarder. This means then that such computed exit velocity should be made higher for the exit end of retarder section 1. This is done by suitably adjusting the several potentiometers 87A, 87B and 87C corresponding amounts, which amounts are determined in accordance with the retardation capabilities of the respective sections. In brief then, each group of these potentiometers 87A, 87B and 87C has a corresponding setting to establish the computed exit velocity for its section, and have settings differing to that extent necessary to provide the appropriate difference in the response of the speed relays for a given section of retarder.

In FIGURE 6 is shown a plot of typical voltage characteristics for section 1 retarder as they apply to the circuits of FIG. 2. The reference voltage of this graph is the computed exit velocity $V_6$, which, after being calculated by the computer, remains fixed for that particular car and is always of a positive nature with respect to ground (zero). The settings of the potentiometers 87A, 87B and 87C as previously discussed are plotted above this reference level because each variable arm of the respective potentiometers is successively more positive with respect to velocity analog voltage $V_6$. These voltages are known as the deviation voltages and are represented by the symbols $DV_A$, $DV_B$ and $DV_C$ for the respective tubes 86A, 86B and 86C. The variable direct current voltage $V_A$, as representative of the actual car velocity, is plotted as a decreasing value starting with a relatively large negative value depending upon the velocity of the car. The pulse train 402 of FIGS. 4A and 4B, which will be described more fully subsequently, is also representative of the actual car velocity; insofar as the car slows down the frequency of the negative-going pulses decreases which results in the average direct current level going in a more positive direction. The inverse is also true.

The function of tubes 86A, 86B and 86C is to add the actual velocity voltage pulses to the then existing direct current cathode potential of these respective tubes. This addition is indicated by the symbols $DV_A+V_A$, $DV_B+V_A$, and $DV_C+V_A$ on the respective curves 411, 412 and 413, which are parallel at all points to curve 410 representing actual velocity $V_A$, but each is successively more positive due to the addition of fixed positive voltages $DV_A$, $DV_B$, and $DV_C$. These three curves 411, 412 and 413 then represent the voltages as applied to the grids of tubes 97A, 97B and 97C.

The output of the differentiator 10 is at zero or ground potential for zero acceleration and operates entirely in the negative direction since the diode 107 prevents it from going in a positive direction. Curve 414 of FIG. 6 represents a typical acceleration curve of a car as it travels through the first section of the retarder. This curve 414 also represents the derivative of curve 410 and the output of the differentiator 10 which is applied to wire 105 of FIG. 2 thence to the cathodes of tubes 97A, 97B and 97C. When the grid voltages on these respective tubes as represented by curves 411, 412 and 413 become more positive than the cathodes, conduction will take place. This is indicated on the curves by points A, B and C respectively. Elsewhere it has been explained that when conduction occurs in these tubes, non-conduction occurred in tubes 99A, 99B and 99C, thus dropping the relays AS, BS and CS, respectively. Note that these three points A, B and C correspond to similarly designated points in FIG. 4A where the point of cut-off of these tubes is designated. It is thus obvious that as a car passes through the retarder and its velocity is reduced to approach the computed velocity, the relays CS, BS and AS drop successively in that order.

It should also be understood that the computed exit velocity $V_6$ for each different car will be different so that the corresponding voltage profile of FIG. 6 for that car will be different. Since the analog voltage of the computed exit velocity is a reference point for the difference or deviation voltages, it is apparent that certain of the curves shown in FIG. 6 will take correspondingly different positions for each different car. Also, the voltage curve for the actual velocity of each car will be characteristic of that car as it is acted upon by the retarder in accordance with the computed exit velocity $V_6$. In brief, the curves of FIG. 6 are included merely by way of explanation and not as representative of any particular car or actual values involved. However, it should be understood that the voltage analog of the actual velocity $V_A$ shown in FIG. 6 is the same as the actual velocity $V_A$ shown in FIGS. 4A and 4B for section 1 of the retarder except that it is inverted. Taking the above operation into consideration for each section individually, it will be apparent that the performance of each car will differ in that section of the retarder because different cars have different thickness wheels, different degrees of roughness, and the like, so that the retarding action of the retarder is not uniform with regard to all cars. For this reason, it is practically impossible to draw a speed profile curve of an average car's performance within a retarder section. Thus, with reference to FIGS. 4A and 4B an effort is made to draw a velocity profile of a car having typical characteristics; but it should be kept in mind, however, that although the characteristics may be illustrated, the curve shown may never have its equivalent for any particular car in actual practice. This equivalent plot of actual car velocity $V_A$ is represented by the curve 401.

At the top of FIGS. 4A and 4B the output of the pulse forming amplifier 24 as found at anodes of tubes 86A, 86B and 86C has been illustrated by pulses 402 of equal width and amplitude differing in frequency as an analog of the actual velocity $V_A$ of a car. These pulses 402 have as a reference level their upper excursion which as can be seen varies with respect to the (B—) volts or ground which level is varied by the settings of the potentiometers 87A, 87B and 87C. Thus, the actual velocity of a car is represented by a frequency of negative-going rectangular pulses from the amplifier 24; but, as above mentioned, this frequency is converted for convenience in the illustration to an equivalent plot of actual car velocity $V_A$ by curve 401.

The relative voltage levels on the grids of tubes 97A, 97B and 97C have been illustrated by curves 411, 412 and 413 respectively of FIG. 6. These grid curves are located relative to their indicated cutoff points sufficiently negative with respect to the cathode voltages $DV_A$, $DV_B$ and $DV_C$ of these tubes as to normally maintain the tubes 97A, 97B and 97C non-conductive; but as the actual velocity $V_A$ of the car decreases, the voltage level of these grids gradually rises toward their respective cutoff points.

Now referring to FIG. 4A where relative velocities are shown instead of relative voltages, the cutoff points A, B and C are located on the velocity curve 401. If the tubes 97A, 97B and 97C had no voltage supply from the differentiator 10 in accordance with the acceleration ACC of a car, then these tubes would have suitable cutoff points shown as points $At_3$, $Bt_3$ and $Ct_3$ on the velocity curve; but since the present invention provides that the control of the speed relays shall be subject to the deceleration of the car, the output of the differentiator 10 will lower the cathode voltages of these tubes from a normal value where no deceleration exists. Referring to the equivalent plot of actual car velocity $V_A$ in FIG. 4A, it will be noted that the change in actual car velocity and the rate of change in car velocity is sufficiently present, so that the output of the differentiator 10 moves the cutoff level for the tubes 97A, 97B and 97C in a manner to advance the time of cutoff to the points A, B and C.

It is noted that when any one of these tubes reaches its cutoff and conducts, it in turn renders non-conductive its associated tube 99A, 99B or 99C which then releases the corresponding speed relay AS, BS or CS. This is designated in each instance in the graph of FIGS. 4A and 4B. The release of each speed relay appropriately operates the retarder. For example, it is assumed that the retarder is operated to an initial position 3 (heavy retardation) so that when the relay CS releases for section 1, then the retarder is moved to position 2 (medium retardation). Similar operation is true in connection with each of the other relays.

It will be noted that the time required for retarder operation represented by lines $t_2$ is shown as some constant value (although it may vary in practice) beyond the time of the cutoff values of the respective tubes due to the output of the differentiator 10. In some instances of car performance in the retarder sections, the output of the differentiator 10 will cause still further advancement of the cutoff values of the respective tubes; but in other instances of car performance there will be considerably less advancement of the cutoff values. This is pointed out because it should be understood that the particular values of the different components selected and the control of the differentiator 10 is selected to cause the proper performance of the retarder sections to cause the actual speed of a car at the point 6 to correspond to or at least closely approximate the computed exit velocity $V_6$. This is the desired result and the amount of anticipation with regard to the required retarder operation is an element in this desired result.

Following the release of a speed relay, such as relay CS, the retarder operates its section from the then existing positon such as position 3 (heavy retardation) to position 2 (medium retardation).

With regard to the release of a speed relay, it can be noted from FIG. 3 that the release of relay CS closes back contact 58 to supply energy (+) from front contact 55 of relay RO, front contact 56 of relay AS, front contact 57 of relay BS to a set of contacts on the weight relays AW1 and AW2 to select the appropriate position of the retarder control mechanism 25.

Similarly, the release of relay BS closes back contact 57 to select another set of contacts on relays AW1 and AW2 to appropriately energize the retarder control mechanism 25.

However, when the relay AS releases, it closes back contact 56 to directly feed energy to the retarder control mechanism 25 to operate it to its zero or open position where no retardation force is applied to the car.

From FIGS. 4A and 4B it can be seen that the equivalent plot of actual car velocity $V_A$ may fall below the computed exit velocity $V_6$ at some time after the relay AS in section 2 releases and opens the retarder which permits the slope or grade of the track to cause the car to accelerate. This brings the equivalent plot of actual car velocity $V_A$ sufficiently above the computed exit velocity $V_6$, as seen in FIG. 4B, resulting in the picking up of the relay AS to again operate the retarder control mechanism 25 to its position 1 (light retardation). This causes the velocity of the car to be again reduced and as it approaches the computed exit velocity $V_6$ the relay AS is again released to open the retarder. At this time the car will be traveling at a velocity closely corresponding to the computed exit velocity $V_6$.

It should be noted that the graphs of FIGS. 4A and 4B as shown are applicable to the control of the sections 1 and 2 of the retarder; but since they are typical they are also applicable to additional multiple section retarders. As the car proceeds through section 2 of the retarder the operation of the speed relays 23 takes place as just described above for the speed relays 15 so that the car reaches the exit point 6 with an actual velocity $V_A$ substantially corresponding to the computed exit velocity $V_6$.

In the above description, the term acceleration has been used broadly to cover either a positive or negative value of acceleration rather than mentioning deceleration in each instance; but it should be noted that when a car is accelerating there is no substantial output from the differentiator 10 for it is made nonlinear by the action of a diode 107 (see FIG. 2) placed across the operational amplifier AR13 in the differentiator 10. This can best be seen by referring to FIG. 5 where it is noted that deceleration of different values causes a velocity advance of the speed relay drop-away point; whereas, acceleration causes a minimum of velocity advance of the speed relay pick-up point. This is pointed out because in the normal functioning of the system, the retarder should cause deceleration of the cars, but if the retardation has been such as to bring the velocity of the car below the desired computed exit velocity, the system should respond quickly to allow the remaining slope of the grade within the retarder to bring the car at least up to the computed exit velocity. If the car velocity is brought above the computed exit velocity then the retarder is again applied as llustrated in connection with FIGS. 4A and 4B. For this reason, in the presence of deceleration the differentiator 10 provides an output to shift the cut-off points of tubes 97A, 97B and 97C so that they become conductive sooner; but in the presence of acceleration the differentiator 10 provides practically no output and thus does *not* shift the cut-off points of the tubes 97A, 97B and 97C to change their point of non-conduction. This is accomplished by diode 107 which prevents erroneous radar signal conditions from simulating acceleration and thus causing the application of undesired retardation.

It was pointed out above how the passage of the car operated the treadle relay TD5BR and the retarder operate relay RO to initially position the retarder. Concurrently, the computing operation takes place so that the computed exit velocity is present in the apparatus for control of the speed control relay circuits 21 and 28 throughout the time that the car is passing through the retarder. When the car arrives at the entrance photocell NPC (see FIG. 1), the entrance photocell relay NPCP is picked up thereby applying ground through front contact 61 to the grid of tube 41 (see FIG. 3) before the opening of back contact 51 of relay NPCPP. A short interval after the relay NPCP picks up, it causes the picking up of relay NPCPP opening the alternative path to ground through back contact 51. When the end of the car passes beyond the entrance photocell NPC, then the relay NPCP is released opening front contact 61 and removing ground from the grid of tube 41. This condition is maintained until the repeater relay NPCPP is released to close back contact 51. This then restores the treadle relay TD5BR to its normally deenergized condition in readiness for the next car.

However, the retarder operation relay RO is maintained picked up through its stick circuit including its front contact 53 and back contact 54 of the exit photocell repeater relay XPCPP. This condition is maintained until the rear end of the car passes beyond the exit photocell XPC at which time the relay XPCP is released just prior to the release of its repeater XPCPP. This means that front contact 62 opens before back contact 54 closes which is a sufficient interval of time for the release of the retarder operation relay RO and the opening of its stick contact 53.

Immediately upon the release of the retarder operation relay RO, energy is supplied through back contact 55 to the retarder operating control mechanism 25 to operate it to its rest position 2 (medium retardation) in readiness for the next car to be controlled. Concurrently, the operation of contacts 63 and 64 of relays XPCPP and XPCP provide an interval for the release of the weight storage relays AW1 and AW2 to render them ready for the next car to be controlled.

In summary, it can be seen that the retarder control of the present invention provides for a multiple position retarder to be operated to its different positions as required in accordance with the actual performance of a car both in a test section and as the car is passing through the retarder. The control of the retarder in accordance with the performance of the car while passing through the retarder includes both the degree of change in velocity and the rate of change of velocity (or acceleration). For example, when a car first enters the retarder we will assume that it is traveling at an actual velocity somewhat above the computed exit velocity required for that car to properly reach its classification track and couple with the first car then stored in that track. The retarder has been initially set in accordance with the weight characteristics of the car. The retarder immediately takes hold and causes deceleration of the car. This deceleration produces an output of the differentiator 10 which modifies the control of the retarder in accordance with the rate of change in car velocity. Due to the characteristics of the differentiator organization, and assuming a constant change in car velocity through the retarder, the differentiator organization continues the then setting for the retarder control; but if the car for some reason should abruptly slow down in speed, the output of the differentiator would be effective to abruptly modify the control so as to more fully take into consideration the peculiarities of the car than has been done in prior systems. This is very essential in a practical automatic control system for retarders since experience has shown that the cars have individualistic characteristics.

Having thus described an automatic control system for car retarders in classification yards as one specific embodiment of the present invention, it is desired to be understood that this form is selected to facilitate in the disclosure of the invention rather than to limit the number of forms which it may assume; and it is to be further understood that various modifications, adaptations and alterations may be applied to the specific form shown to meet the requirements of practice, without in any manner departing from the spirit or scope of the present invention as defined in the appended claims.

What we claim is:

1. Control apparatus for classification yards having a stretch of railway track of predetermined length and grade and a car retarder located near the entrance end of said stretch, comprising, means for measuring the rolling characteristics of a car approaching said retarder, computing means controlled by said measuring means for computing a speed at which the car should leave said retarder to travel to a predetermined point in said stretch and arrive at such point at a particular preselected speed, means for measuring the actual speed of a car passing through said retarder, and means jointly controlled by said computing means and said speed measuring means for releasing said retarder when the speed of said car substantially equals said computed speed, error determining means obtaining a difference between the measured actual car speed and the computed leaving speed, and means controlled by the error determining means for modifying said retarder control means in accordance with the rate of change of the speed of said car within said retarder.

2. In a control system for railroad classification yards having a stretch of track with a car retarder located near the entrance of said stretch on a slight grade, said car retarder being operable to different positions for applying different degrees of retardation, measuring means for measuring the rolling characteristics of a car approaching said retarder, computing means controlled by said measuring means for computing the leaving speed at which the car should leave said retarder to travel to a predetermined point in said stretch and arrive at such point at a particular pre-selected speed, measuring means for measuring the actual speed of a car passing through said retarder, error determining means obtaining a difference between the measured actual car speed and the computed leaving speed, deceleration means controlled by the error determining means for producing an output in accordance with the rate of change of the speed of said car within said retarder, and control means jointly controlled by said computing means, said measuring means and said deceleration means for operating said retarder to its different positions as required to cause said car to leave said retarder at a speed substantially corresponding with said computed leaving speed.

3. A control system for railroad car classification yards comprising, a stretch of railroad track including a car retarder to decelerate cars entering said stretch of track, a bank of speed relays to control said retarder to determine the amount of braking affect applied to a car within said retarder, measuring means for determining the actual velocity of a car within said retarder, computer means including weight responsive means and means responsive to the performance of the car just prior to its entry into said retarder for computing the exit speed at which said car should leave said retarder to travel to a predetermined remote point in said stretch of track and perform proper coupling at that point, error determining means obtaining a difference between the measured actual velocity and the computed exit speed, differentiating means controlled by the error determining means to compute an analog of the rate of deceleration of a car in passing through said retarder, control means responsive to said measuring means and said computer means and said differentiating means for actuating said bank of speed relays in accordance with the speed and rate of deceleration of a car to control said retarder to cause said car to leave at an actual exit speed substantially equal to the computed exit speed for proper coupling at said remote point.

4. In a control system for a car retarder located in a stretch of track of a railroad classification yard, said car retarder being operable to different positions for applying different degrees of retardation, means for selecting the leaving speed of a car required for that car to travel from the exit end of said retarder to a predetermined remote point in said stretch of track and perform a proper coupling at that point, speed measuring means for measuring the actual speed of a car passing through said retarder, error determining means obtaining a difference between the measured actual car speed and the computed leaving speed, differentiating means cntrolled by the error determining means for computing an analog of the rate of deceleration of a car passing through said retarder, and control means responsive to said measuring means and said differentiating means for controlling said retarder to the positions required for causing a car to be properly controlled to leave said retarder at said selected speed.

5. In a control system for railroad classification yards having a stretch of track with a car retarder located near the entrance to said stretch on a slight grade, said car retarder being operable to different positions for applying different degrees of retardation, a test section in advance of said retarder, means responsive to the performance of a car in passing through said test section for computing the exit speed at which a car must leave the retarder to travel to a predetermined remote point and arrive at such point at a particular preselected speed, measuring means for measuring the actual velocity of a car within said retarder, error determining means obtaining a difference between the measured actual velocity and the computed exit speed, differentiating means governed by the error determining means for determining the rate of change of the speed of said car while passing through said retarder, and control means governed by the differentiating means for controlling said car retarder to its different positions as required to cause that car to substantially approach said computed exit speed.

6. An automatic car retarder control system comprising, a stretch of railway track including a car retarder operable to provide different degrees of retardation, a test section in said stretch of track in approach of said retarder, weight responsive apparatus conditioned in accordance with the weights of cars respectively approaching the retarder, speed measuring means for indicating the speed of a car within the retarder, computing means for computing the desired exit speed at which each car should leave the retarder in accordance with the performance of the car in passing through said test section and in accordance with the weight of the car as determined by said weight responsive apparatus, error velocity means for obtaining the difference between an analog of the speed of a car as determined by said speed measuring means and an analog of the exit speed of the car as determined by said computing means, differentiating means for differentiating an analog of the error velocity as determined by said error velocity means with respect to time, a sped relay for governing said retarder, circuit means for maintaining said speed relay in its picked up position when a car is within the retarder provided that the speed of the car as indicated by said speed measuring means is above the desired exit speed for the car as determined by said computing means, said circuit means being effective to cause said relay to be dropped away at a car speed above, but approaching, the desired exit speed determined by said computing means in accordance with the acceleration of the car as determined by said differentiating means, and car retarder control means for reducing the degree of retardation of the car upon the dropping away of said speed relay.

7. A car retarder control system for railroad classification yards comprising, a stretch of railway track including a car retarder, a test section in said stretch of track in approach of said retarder, a weighing means indicative of the weight of each respective car approaching said retarder, a weight storage means responsive to said weighing means, speed measuring means providing a continuous variable output in voltage analog form proportional to the actual speed of each respective car as it travels through said retarder, computing means for determining the desired exit velocity in voltage analog form based upon data from said test section and said weight storage means, error velocity measuring means for subtracting the desired exit velocity analog provided by said computing means from the actual velocity analog provided by said speed measuring means, differentiator means for providing the rate of change with respect to time of said error velocity means output, a speed relay for effecting the braking force of said retarder, a control circuit means responsive to said computing means, said differentiator means, and said speed measuring means governed to actuate said speed relay to reduce the retardation force applied to said retarder as a car approaches the desired exit velocity determined by said computing means.

8. The method of retarding railroad cars in a car classification yard to obtain proper coupling speeds consisting of a stretch of railway track including, in sequence, a hump, a series of switches for several branch tracks, a retarder on each of the several said branch tracks, and a test section in advance of said retarder which comprises rolling a car by gravity down an incline, timing its traverse over said testing section, weighing said car, storing said weight information, measuring the actual velocity during said car's time within the retarder, computing from the timing operation and weighing information the desirable exit velocity from said retarder, forming a voltage varying proportionally with said actual velocity, deriving an error velocity voltage analog from the difference between said actual velocity and said exit velocity, differentiating said error velocity voltage analog with respect to time to determine acceleration, applying said desired exit velocity to control circuits thereby forming a reference voltage, applying said actual velocity voltage analog to another element in said control circuitry thereby providing said error velocity signal, said error velocity signal in conjunction with said differentiating signal providing a control signal for a control tube thereby actuating a relay governing the retardation force applied to said retarder.

9. An automatic control system for railroad car classification yards comprising, a stretch of railway track including a car retarder to provide a braking force on the wheels of railway cars while traversing said retarder section, a test section in advance of said retarder to provide velocity measurements, weight responsive apparatus selectively determining "light," "medium" and "heavy" cars, a weight storage relay system responsive to said weight responsive apparatus, radar speed measuring means for providing a beat frequency signal whose frequency is proportional to the actual speed of a car passing through said retarder, pulse forming means by which said radar speed measuring means beat frequency signals are formed into pulses of equal width and amplitude, computing means governed according to the performance of each car rolling over said test section of track to said weight storage relays for providing a continuously variable output proportional to the desired release speed of the car from said retarder, a bank of speed relay control means for governing the release of said retarder, circuit means for obtaining the error velocity or difference voltage analog between the actual velocity pulses and the desired exit velocity voltage analog, differentiating means for providing the differential with respect to time of the analog obtained by said circuit means which results in the acceleration voltage analog, integrating means by which said pulses of equal width and amplitude are summed with respect to the desired exit velocity voltage analog, control tube means for providing proper bias to a relay control tube whose cut-off voltage is determined by said summed pulses with respect to said acceleration voltage analog, said relay control tube, in turn, providing conditions for actuating said bank of speed relays in steps thereby applying less retardation force to said retarder mechanism in order to allow a car to approach the desired exit velocity.

References Cited by the Examiner

UNITED STATES PATENTS

| 1,766,539 | 6/1930 | Prescott | 246—182 |
| 2,976,401 | 3/1961 | Berill | 246—182 |
| 3,110,461 | 11/1963 | Brockman | 246—182 |
| 3,169,736 | 2/1965 | Brown | 246—182 |
| 3,214,581 | 10/1965 | Coley | 246—182 |

FOREIGN PATENTS

| 921,845 | 1/1947 | France. |

OTHER REFERENCES

A thesis prepared by Wilhelm Koth and titled "Die Laufzielsteinerimg in der Ablanfdynamik," Germany, 151 pages, October 29, 1953 (a corresponding 131 page English translation of this thesis titled "Humped Freight Cars," pages 82–95).

An article titled "Automation for Freight Yards," by V. A. Dasburg, appearing in Electrical Engineering on pages 986–1000 in the November 1955 issue.

ARTHUR L. LA POINT, *Primary Examiner.*

LEO QUACKENBUSH, JAMES S. SHANK, *Examiners.*

L. J. LEONING, S. T. KRAWCZEWICZ,
*Assistant Examiners.*